United States Patent
Spaargaren

(10) Patent No.: US 6,230,770 B1
(45) Date of Patent: May 15, 2001

(54) STUMP CHIPPER AND METHOD FOR THE OPERATION THEREOF

(75) Inventor: Derk Pieter Marinus Spaargaren, Hoofddorp (NL)

(73) Assignee: Vermeer-Holland B.V., Hoofddorp (NL)

( * ) Notice: Subject to any disclaimer, the term of this patent is extended or adjusted under 35 U.S.C. 154(b) by 0 days.

(21) Appl. No.: 09/527,213

(22) Filed: Mar. 16, 2000

(30) Foreign Application Priority Data

Mar. 19, 1999 (NL) .................................................. 1011620

(51) Int. Cl.⁷ .................................................. A01G 23/06
(52) U.S. Cl. ........................ 144/334; 37/302; 144/24.12
(58) Field of Search ................................ 37/94, 189, 302; 144/24.12, 334; 241/101.72, 101.76

(56) References Cited

U.S. PATENT DOCUMENTS

| | | | |
|---|---|---|---|
| 5,203,388 | * 4/1993 | Bowling | 144/24.12 |
| 5,435,359 | * 7/1995 | Craft | 144/24.12 |
| 5,555,652 | * 9/1996 | Ashby | 37/302 X |
| 5,655,581 | 8/1997 | Craft . | |
| 5,743,314 | 4/1998 | Puch . | |
| 6,003,570 | * 12/1999 | Falatok et al. | 144/24.12 |
| 6,014,996 | * 1/2000 | Egging et al. | 144/24.12 |

FOREIGN PATENT DOCUMENTS 2 293 303  3/1996  (GB) .

* cited by examiner

Primary Examiner—W. Donald Bray
(74) Attorney, Agent, or Firm—Young & Thompson

(57) ABSTRACT

A stump chipper for at least partially removing a stump and the like from the ground, by means of chipping, comprises a subframe that can be positioned on the ground and that supports a movable arm at the end of which a chipping wheel is mounted such that it is rotatable about its axis. The chipping wheel is also rotatable with respect to the arm about an axis of rotation oriented transversely to the axis of the chipping wheel.

19 Claims, 3 Drawing Sheets

STUMP CHIPPER AND METHOD FOR THE OPERATION THEREOF

BACKGROUND OF THE INVENTION

1. Field of the Invention

The invention relates to a stump chipper for at least partially removing a stump and the like from the ground by means of chipping, comprising a subframe that can be positioned on the ground and that supports a movable arm at the end of which a chipping wheel is mounted such that it is rotatable about its axis, which chipping wheel is also rotatable with respect to the arm about an axis oriented transversely to the axis of the chipping wheel.

2. Description of the Related Art

Such a stump chipper is disclosed in U.S. Pat. No. 5,555,652. The known stump chipper has an arm that can be swung back and forth on the subframe, such that the rotating chipping wheel is movable transversely over the stump. As the stump is chipped further and further away the arm also makes a lowering movement, such that the chipping wheel can continue to chip away the stump.

Although the known stump chipper is suitable for its job, the operation thereof remains demanding, intensive work. Operators must continually make sure that the chipping wheel remains above the stump when moving back and forth. After some time the concentration required for this can no longer be maintained, as a result of which the work is adversely affected.

A significant disadvantage, with which the above is associated, is also the restricted work rate of the known stump chipper. As a consequence of the back and forth movement, the action of the known chipper is of a discontinuous nature. The speed with which a stump can be removed therefore remains restricted.

SUMMARY OF THE INVENTION

The aim of the invention is to provide a stump chipper which does not have these disadvantages. This aim is achieved in that the chipping wheel is continuously rotatable in one and the same direction about the axis oriented transversely to the axis of the chipping wheel, in particular through at least 360°.

In the case of the stump chipper according to the invention the chipping wheel does not have to make a back and forth movement over the stump but can simply be brought into rotation transversely to its own axis. This rotation can be maintained until the desired depth has been reached.

The action of the stump chipper according to the invention is of a continuous nature. Consequently the work rate is high.

It is also an advantage that it is no longer necessary accurately to check that the chipping wheel is not swinging through too far, away from the stump. The stump chipper according to the invention is able independently to chip away the stump to a pre-set depth, intervention by the operators being needed only after this.

Operation is consequently less demanding on the operators; a considerable degree of automation is even possible.

In connection with the removal of larger, thick stumps, the chipping wheel can be movable transversely to both its axis and the axis of rotation. The chipping wheel can be displaced from the centre of the pivot ring, so that the chipping range can be adjusted to the diameter of the stump.

According to a preferred embodiment the chipping wheel can have been mounted on an articulated arm, the first arm section of which is connected to the subframe such that it can move up and down, which first arm section supports a second arm section, at the end of which the chipping wheel is located. The second arm section can be pivoted relative to the first arm section about a shaft parallel to the axis of the chipping wheel.

The invention also relates to a method for removing a stump from the ground by means of a device as described before, comprising the following steps:

rotating the chipping wheel about its axis to cut away the material of the stump, simultaneously rotating the chipping wheel about the axis of rotation transverse to the axis of the chipping wheel, lowering the chipping wheel.

The desired results, that is to say simple, effective removal of the stump, can best be achieved if the chipping wheel is rotated through at least 360° about the axis of rotation transverse to the axis of the chipping wheel and is continuously rotated in one and the same direction about the axis of rotation transverse to the axis of the chipping wheel.

BRIEF DESCRIPTION OF THE DRAWINGS

The invention will be explained in more detail below with reference to an illustrative embodiment shown in the figures.

DESCRIPTION OF THE PREFERRED EMBODIMENTS

Figure 1:
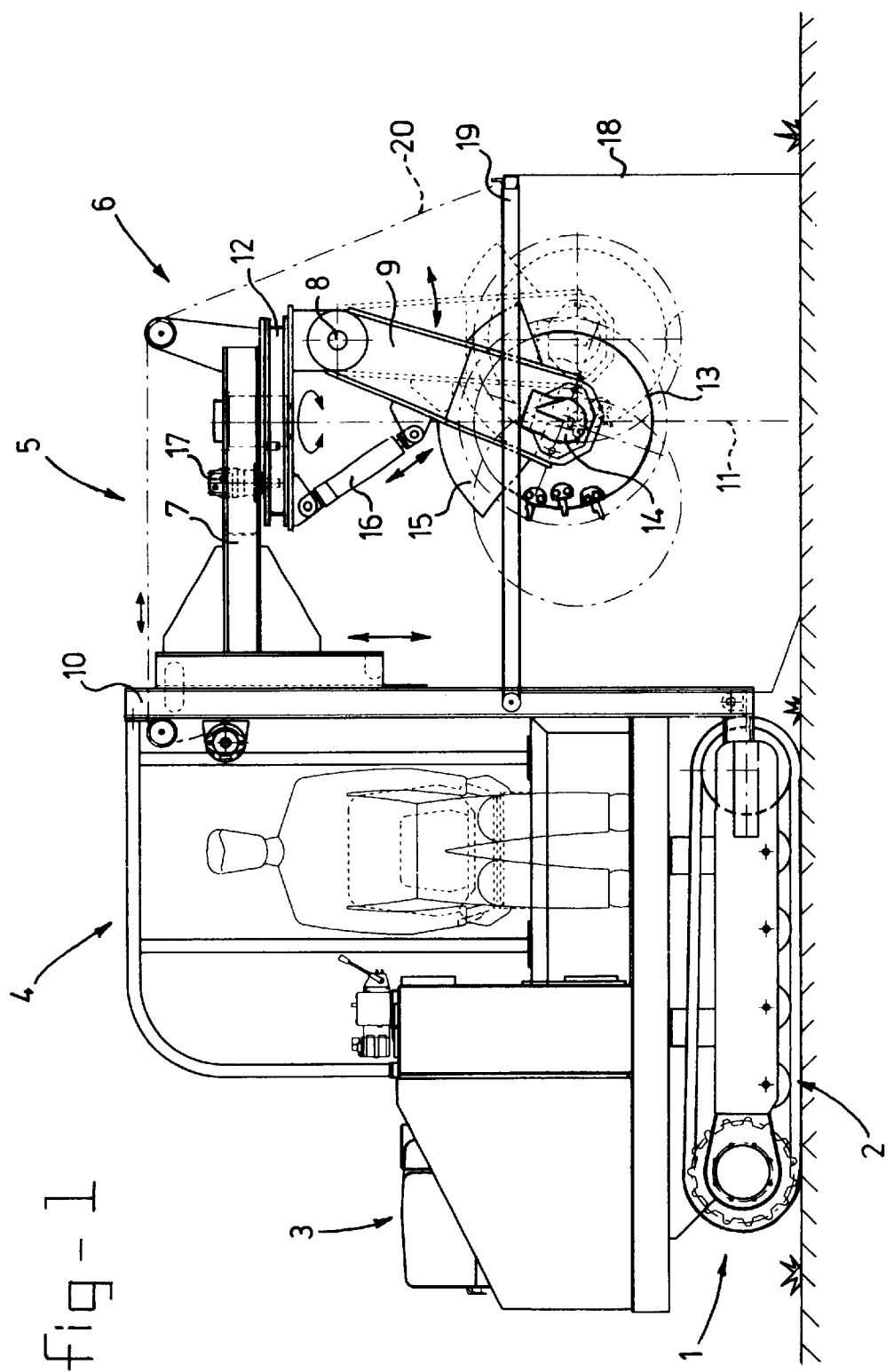
FIG. 1 shows a side view of the stump chipper in a first position.
Figure 2:
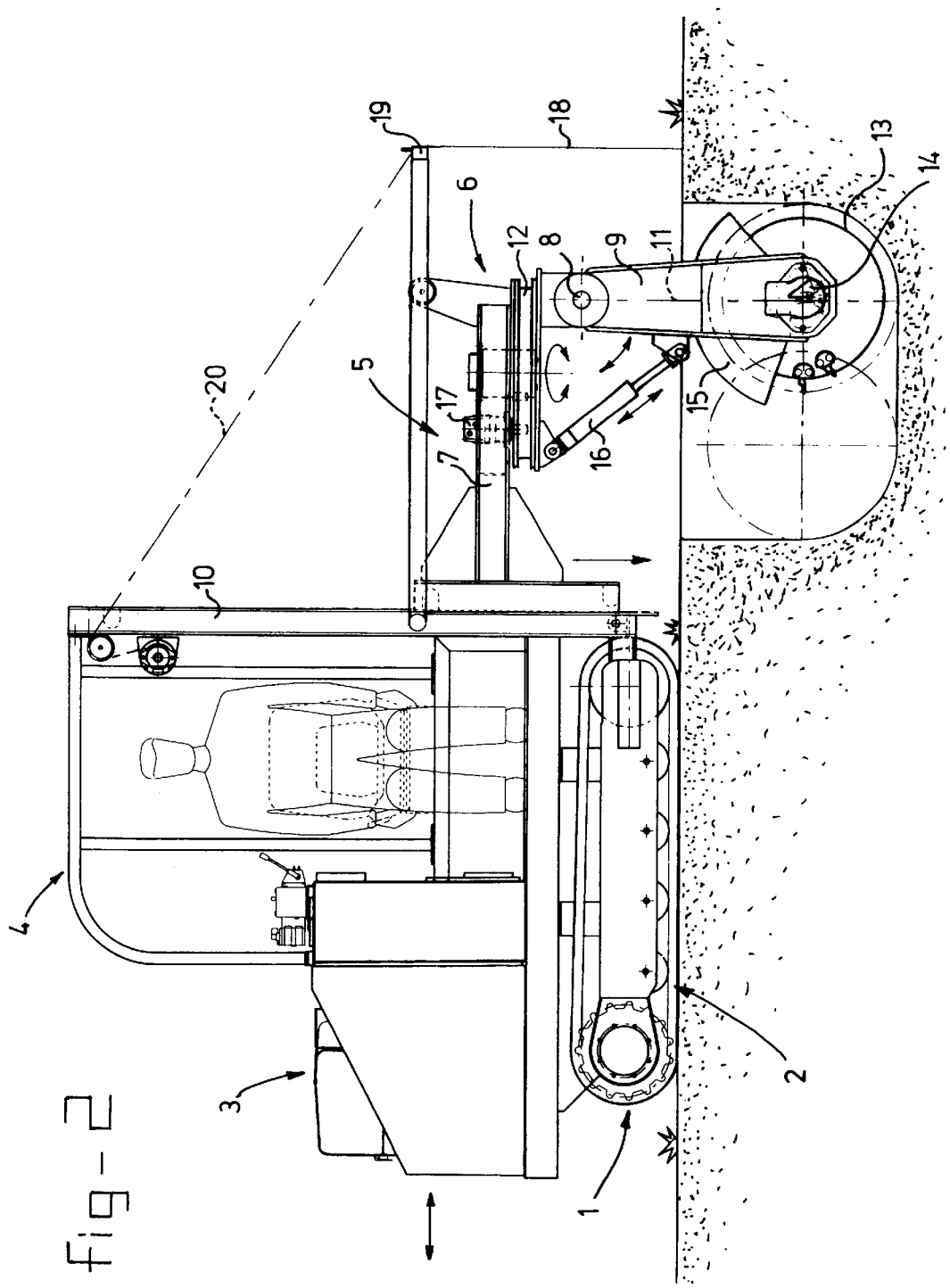
FIG. 2 shows a side view of the stump chipper in a second position.
Figure 3:
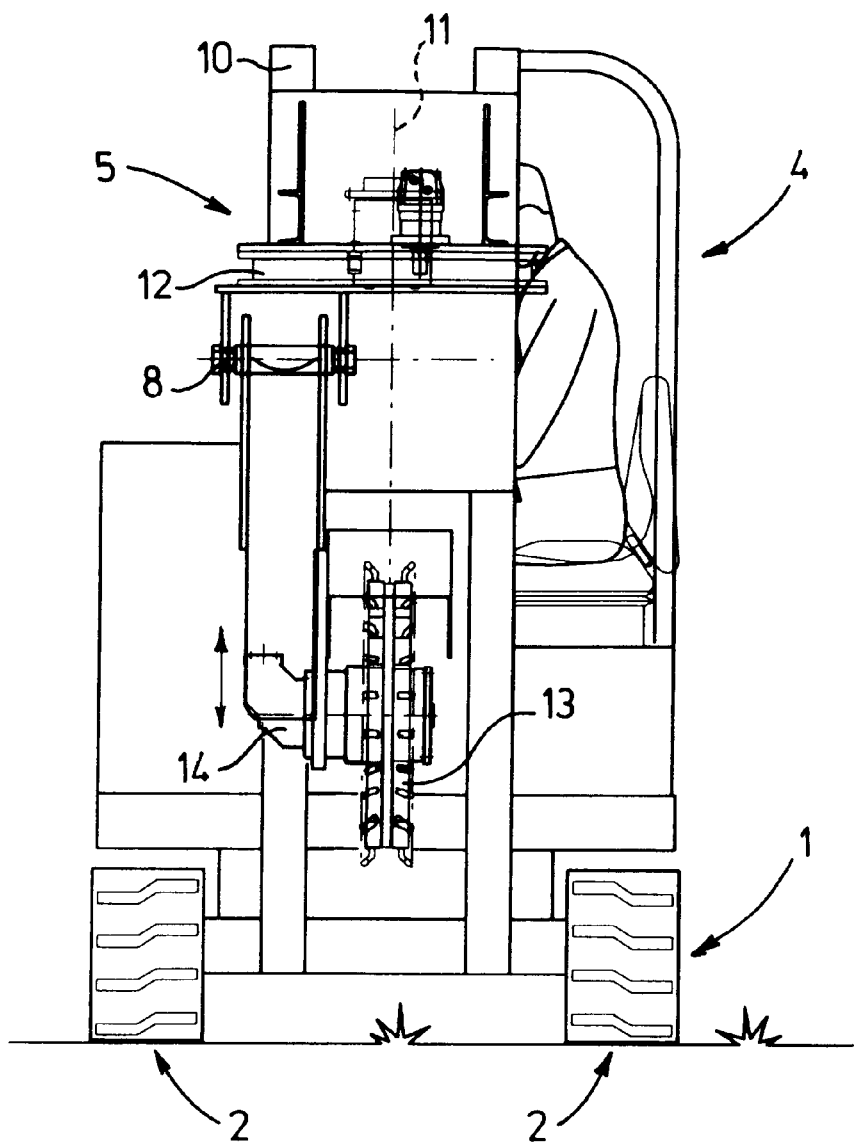
FIG. 3 shows a front view.

The stump chipper shown in FIGS. 1–3 comprises a subframe 1, which has two caterpillar tracks 2 known per se. The diesel hydraulic drive 3, a place for the operator 4 and the chipping device, indicated in its entirety by 5, are located on this subframe 1.

Said chipping device comprises an arm 6, which has a first, horizontal arm section 7, on which a pivot arm 9 is mounted by means of hinge 8. As arm 9 is pivotally connected to arm section 7, arm 6 is articulated.

The first, horizontal arm section 7 can be slid up and down over slide 10.

The pivot arm 9 and the hinge 8 are also rotatable about the axis 11 by means of live ring 12.

The pivot arm 9 supports at its end the chipping wheel 13 with its hydraulic drive 14. A guard 15 is also fitted at the top of the chipping wheel 13.

By means of the hydraulic piston/cylinder device 16, the pivot arm 9 can be pivoted between the positions shown by broken lines in FIG. 1.

According to the invention, the pivot arm 9, with its hinge 8, is also rotatable about the axis 11 which runs transversely to the first horizontal arm section 7. This rotation facility is provided by the pivot ring 12, which can be brought into rotation by means of the hydraulic motor 17.

When removing a stump, the chipping wheel 13 can be moved downwards, until it comes into contact with the top of the stump, with pivot arm 9 in a certain position, which position is dependent on the diameter of the stump.

This vertical movement is made possible by sliding the chipping device 5 along the slide 10, as shown in FIGS. 1 and 2, which show a high and a low position, respectively.

As soon as the (rotating) chipping wheel comes into contact with the stump the pivot ring 12 is brought into rotation, the entire chipping device 5 being moved ever further downwards over the guide 10.

The advantage of this procedure is that chipping away the stump can take place largely automatically, without the operator having continuously to control the movements of the arms 7 and 9.

Depending on the diameter of the stump, the chipping wheel 13 can be brought into the desired transverse position by pivoting the pivot arm 9 by means of the hydraulic piston/cylinder device 16. As a result the chipping treatment can be matched to the diameter of the stump to be treated.

According to the invention there can also be a guard apron 18, suspended form a boom 19 and a line 20, around the location where the stump is being treated.

What is claimed is:

1. Stump chipper for at least partially removing a stump from the ground by means of chipping, comprising:
    a subframe;
    a movable arm connected to the subframe;
    a chipping wheel rotatably mounted to an end of the movable arm such that the chipping wheel is rotatable about a chipping wheel axis, which chipping wheel is also rotatable with respect to a first section of the arm about an arm axis oriented transversely to he chipping wheel axis, wherein the chipping wheel (13) is continuously rotatable in one and the same direction about the arm axis oriented transversely to the chipping wheel axis through at least 360°.

2. Stump chipper according to claim 1, wherein the chipping wheel (13) is movable transversely to both the chipping wheel axis and the arm axis.

3. Stump chipper according to claim 1, wherein the movable arm is articulated, the first arm section of the movable arm being connected to the subframe (1) such that the movable arm can move up and down with respect to the subframe, the first arm section supporting a second arm section (9), at the end of which the chipping wheel (13) is located.

4. Stump chipper according to claim 3, wherein the second arm section (9) can be pivoted relative to the first arm section (7) about a shaft (8).

5. Stump chipper according to claim 4, wherein the shaft (8) is parallel to the chipping wheel axis.

6. Stump chipper according to claim 4, wherein the shaft (8) of the second arm section (9) is attached to the first arm section (7) by means of a pivot ring (12).

7. Stump chipper according to claim 4, wherein the first arm section (7) can be slid over an essentially vertical slide (10) on the subframe (1).

8. Method for at least partially removing a stump from the ground by means of a device according to claim 1, comprising the following steps:
    rotating the chipping wheel about the chipping wheel axis to cut away material of the stump, simultaneously rotating the chipping wheel about the arm axis of rotation transverse to the chipping wheel axis, lowering the chipping wheel.

9. Method according to claim 8, wherein the chipping wheel is rotating through at least 360° about the arm axis of rotation transverse to the chipping wheel axis.

10. Method according to claim 8, wherein the chipping wheel is rotated continuously in one and the same direction about the arm axis of rotation transverse to the chipping wheel axis.

11. A stump chipper comprising:
    a subframe;
    an articulated arm connected to the subframe having a first section attached to the subframe and a second section connected to the first section, the first and second sections being connected through a hinge to allow pivoting of the second arm with respect to the first arm about a hinge axis, with the hinge being connected to the first section through a ring which allows the hinge to continuously rotate in a given direction about an arm axis with respect to the first section; and
    a chipper wheel attached to an end of the second section away from the hinge so that the chipper wheel may be rotated with respect to the second section about a chipper wheel axis.

12. The stump chipper of claim 11, further comprising a means for selectively rotating the second section about the hinge axis.

13. The stump chipper of claim 12, wherein the means for selectively rotating the second section comprises a piston/cylinder device connected between the second section and the ring.

14. The stump chipper of claim 11, wherein the arm axis is generally perpendicular to the chipper wheel axis.

15. The stump chipper of claim 14, wherein the second section may be pivoted about the hinge axis to move the chipper wheel axis into intersection with the arm axis.

16. The stump chipper of claim 15, wherein an effective chipping area is adjustable by controlling a distance between the chipper wheel axis and the arm axis.

17. The stump chipper of claim 11, wherein the first section is slidably connected to the subframe so that the articulated arm and the attached chipper wheel may be controllably moved up and down.

18. A method for chipping a stump using a stump chipper comprising:
    a subframe;
    an articulated arm connected to the subframe having a first section movably attached to the subframe and a second section connected to the first section, the first and second sections being connected through a hinge to allow adjustable pivoting of the second arm with respect to the first arm about a hinge axis with the hinge being connected to the first section through a ring which allows the hinge to continuously rotate with respect to the first section about an arm axis; and
    a chipper wheel attached to an end of the second section away from the hinge so that the chipper wheel may be rotated with respect to the second section about a chipper wheel axis;
    the method comprising the steps of:
    causing the chipper wheel to rotate about the chipper wheel axis;
    while the chipper wheel is rotating about the chipper wheel axis, continuously rotating ring in a given direction so that the second section rotates with respect to the first section through more than 360°; and
    lowering the articulated arm with respect to the subframe.

19. The method of claim 18, further comprising the step of adjusting the position of the second arm with respect to the first arm to control a distance between the chipper wheel axis and the arm axis to control an effective chipping area.

* * * * *